US012601914B2

(12) United States Patent (10) Patent No.: US 12,601,914 B2
Tong et al. (45) Date of Patent: Apr. 14, 2026

(54) VIRTUAL REALITY DISPLAY DEVICE BASED ON PHASE CHANGE MATERIALS

(71) Applicant: Huazhong University of Science and Technology, Wuhan (CN)

(72) Inventors: Hao Tong, Wuhan (CN); Qipei Zhou, Wuhan (CN); Qingshan Tan, Wuhan (CN); Binhao Wang, Wuhan (CN); Xiangshui Miao, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 13 days.

(21) Appl. No.: 19/003,229

(22) Filed: Dec. 27, 2024

(65) Prior Publication Data

US 2025/0216674 A1 Jul. 3, 2025

(30) Foreign Application Priority Data

Dec. 27, 2023 (CN) .......................... 202311844323.4

(51) Int. Cl.
*G02B 27/01* (2006.01)
*G02B 5/20* (2006.01)
*G02F 1/13357* (2006.01)

(52) U.S. Cl.
CPC ........... *G02B 27/0101* (2013.01); *G02B 5/20* (2013.01); *G02F 1/133603* (2013.01); *G02F 1/133606* (2013.01); *G02B 2027/0112* (2013.01)

(58) Field of Classification Search
CPC .................. G02B 27/0101; G02B 5/20; G02B 2027/0112; G02F 1/133603; G02F 1/133606
See application file for complete search history.

(56) References Cited

U.S. PATENT DOCUMENTS

2007/0090387 A1* 4/2007 Daniels ................... H01L 24/75
257/E33.059
2018/0284497 A1* 10/2018 Hosseini ................. G02F 1/137
(Continued)

FOREIGN PATENT DOCUMENTS

CN 110568692 A * 12/2019 ............... G02F 1/19
CN 112313556 A 2/2021
(Continued)

OTHER PUBLICATIONS

Machine translation of CN-110568692-A (Year: 2019).*

*Primary Examiner* — Matthew Y Lee
(74) *Attorney, Agent, or Firm* — Nitin Kaushik

(57) ABSTRACT

The invention relates to a virtual reality display device based on phase change materials, which has characteristics of a high resolution, a large color gamut and a high frame rate, and can provide a more real and vivid virtual reality experience. The display technology mainly includes a backlight emitting component, a quantum dot excitation layer, an all-dielectric phase change filter structure, an optical lens, a reflection mirror and a device cover. The backlight emitting component comprises an LED excitation light source and a diffusion plate for generating and dispersing light. The virtual reality display technology based on phase change materials has a wide application prospect. In addition to being used in virtual reality devices such as VR headsets, it can also be used in augmented reality devices such as AR glasses. When implemented, it can be designed and adjusted according to actual needs to provide a best user experience.

7 Claims, 9 Drawing Sheets

(56)                          References Cited

U.S. PATENT DOCUMENTS

2020/0409228  A1*  12/2020  Carrillo ..................... G02F 1/19
2021/0223568  A1*   7/2021  Makinen ............ G02B 27/4272
2022/0099871  A1*   3/2022  Fujii ................... G02B 5/1814
2023/0333596  A1*  10/2023  Gao ........................ G06F 3/013
2024/0241380  A1*   7/2024  Hassan Firoozi ...... G02B 1/002
2024/0288731  A1*   8/2024  Yajima ............. G02F 1/133614

FOREIGN PATENT DOCUMENTS

CN          113253459  A   *   8/2021   ......... G02B 27/0172
CN          115047632  A       9/2022
KR        20210028802  A   *   3/2021   ......... G01N 21/8803

* cited by examiner

301

302

303

$(HL)^X$

401

402

403

VIRTUAL REALITY DISPLAY DEVICE BASED ON PHASE CHANGE MATERIALS

CROSS-REFERENCE TO RELATED APPLICATIONS

The application claims priority to Chinese patent application No. 2023118443234, filed on Dec. 27, 2023, the entire contents of which are incorporated herein by reference.

TECHNICAL FIELD

The present invention relates to the technical field of phase change materials, and more specifically, to a virtual reality display device based on phase change materials.

BACKGROUND

Virtual reality (VR) technology, as a new way of interactive experience, has achieved significant development and application in the fields of entertainment, education, training and so on. Virtual reality display devices play a key role in this process, and their display performance has an important impact on the reality and comfort of user experience. However, traditional virtual reality display devices face challenges in resolution, switching speed and color gamut. In order to overcome these limitations, virtual reality display devices based on phase change materials come into being.

Traditional virtual reality display devices, including liquid crystal displays (LCDs) and organic light-emitting diodes (OLeds), have made some progress, but there are still problems such as insufficient resolution, slow switching speed and small color gamut. These problems lead to a phenomenon that users may encounter image blur, lack of dynamic sense and color distortion in virtual reality environment, which reduces sense of reality and attractiveness of virtual reality experience.

Virtual reality display devices based on phase change materials provide a new way to solve limitations of traditional technology. Phase change material (PCM) is a kind of material that can change phase state under external stimuli such as temperature, electric field and light. In virtual reality displays, an introduction of phase change materials will significantly improve key performance indicators such as resolution, switching speed and color gamut.

A direct application of phase change materials in VR will have problems such as low transmittance and serious stray light of filtering effect in the actual process.

An emergence of virtual reality display devices based on phase change materials has brought new breakthroughs in the field of virtual reality. Characteristics of phase change materials such as high resolution, fast switching speed and wide color gamut create a more realistic, smooth and vivid virtual reality experience for users. With a continuous development and innovation of technology, virtual reality display devices based on phase change materials are expected to be further improved and bring more possibilities to the virtual reality application field.

SUMMARY

The present invention relates to a virtual reality display device based on phase change material. The display device comprises a plurality of key components, including a backlight source emitting assembly, a quantum dot excitation layer, an anti-reflection layer, an all-dielectric phase change filter structure, an optical lens, and a device cover.

The backlight source component comprises an LED excitation light source and a diffusion plate, which is located on top of the LED excitation light source for evenly dispersing the light source. A wavelength of the LED excitation light source is 420 nm, which can be adjusted according to actual needs. Diffusion plates are usually made of polycarbonate (PC) or acrylic (PMMA) and are sized to match a size of the LED excitation light source.

The quantum dot excitation layer is located above the backlight source and is used to receive and excite the background light generated by the backlight source. The quantum dot excitation layer contains pixelated red and green quantum dots, which are ordered in an embedded manner to achieve precise color control.

The all-dielectric phase change filter structure is located above the quantum dot excitation layer, including an upper dielectric multilayer film system, a phase change intermediate cavity layer and a lower dielectric multilayer film system. These structures are designed to filter out specific wavelengths of light. Among them, a structure of dielectric multilayer film systems are H (LH) x, where His a film layer of high refractive index and low extinction coefficient, L is a film layer of low refractive index and low extinction coefficient, X is the number of periods of the film layer group ($X \geq 1$), and an optical thickness of each film layer is one-fourth of the wavelength used. High refractive index dielectric materials can be $TiO_2$, $ZnO$, $ZnS$, and low refractive index materials can be $SiO_2$, $Al_2O_3$, $MgF_2$.

The phase change intermediate cavity layer comprises three layers, including an upper transparent electrode layer, a middle phase change layer and a lower transparent electrode layer. The phase change material layer can choose one of GST, $Sb_2S_3$, GSST, IST, GeTe, SbTe, BiTe, InSb, InSe, GeSb, SbSe, GaSb, GaSb, GeSbTe, AgInSbTe, InSbTe or AgSbTe. A refractive index n and an extinction coefficient k change with a transformation between crystalline and amorphous states.

The optical lens is located behind the phase change filter structure and is used to focus the treated light. Zoom lenses can be selected to adjust a focusing distance according to user needs.

The device cover is placed over a reflection mirror to protect the components and provide a human-machine interface. The cover is equipped with a touch sensing layer, through which the user can interact with the virtual reality display device.

The all-dielectric filter structure and all-dielectric intermediate cavity introduced in the invention can well solve these problems in the process of VR application of phase change display.

The virtual reality display device of the present invention can provide a display effect of high resolution, high contrast and high color reproduction, and can realize the rapid and accurate optical modulation through the phase change filter structure. In addition, through a design of optical lenses and reflection mirrors, the technology can achieve a wide viewing angle and a large depth range of virtual reality display, improving the user experience. The design of the touch sensing layer enables users to interact directly with the display device, improving the operation convenience of the device.

Embodiments of the invention include, but are not limited to, virtual reality and augmented reality devices such as VR headsets, AR glasses, and HUD displays.

Figure 1:
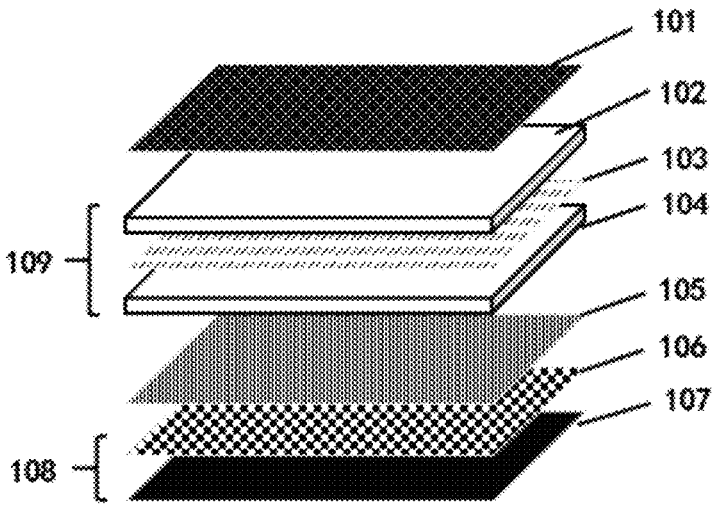
FIG. 1 is a diagram of a multilayer film structure of the present invention.

Numerals in the drawings: 101, absorption layer; 102, upper dielectric multilayer film; 103, phase change intermediate cavity layer; 104, lower dielectric multilayer film; 105, anti-reflection film; 106, pixelated quantum dot film; 107, LED excitation light source; 108, backlight source; 109, all-dielectric phase change filter structure; 201, high refractive index film layer; 202, low refractive index film layer; 203, high refractive index film layer; 301, high refractive index film layer; 302, low refractive index film layer; 303; high refractive index film layer; 401, transparent electrode layer; 402, phase change material layer; 403, transparent electrode layer; 501, absorption layer; 502, upper dielectric multilayer film; 503, phase change intermediate cavity layer; 504, lower dielectric multilayer film; 505, anti-reflection film; 506, pixelated quantum dot film; 507, LED excitation light source; 508, red sub-pixel; 509, green sub-pixel; 510, blue sub-pixel; 901, device cover; 902, backlight source; 903, anti-reflection layer; 904, phase change filter structure; 905, absorption layer; 906, optical lens.

DETAILED DESCRIPTION OF THE EMBODIMENTS

In order to make the purpose, technical scheme and advantages of the invention more clearly understood, the invention is further explained combined with the drawings and embodiments in the following embodiment. It should be understood that the specific embodiments described herein are intended only to explain the invention and are not intended to qualify it. In addition, the technical features referred to in the various embodiments of the invention described below may be combined as long as they do not conflict with each other.

The present invention is aimed to provide a virtual reality display device based on phase change material, which has a high luminous efficiency, a high transmittance of light filter component, a fast response speed, a large display color gamut, a strong color reduction ability, and the like.

The display device comprises a display array consisting of a plurality of display units, as shown in FIG. 1. The display unit comprises a pixelated backlight source emitting component 108, an anti-reflection layer 105, an all-dielectric phase change filter structure 109 and a metal absorbing layer 101. The backlight source emitting component 108 comprises an LED excitation light source 107 and a pixelated quantum dot film 106. The anti-reflection layer 105 comprises a low refractive index film with a film layer thickness of one quarter of the selected wavelength of the optical thickness of the low refractive index film, which is used to improve the transmittance, but also greatly reduce the energy of continuous reflection of light between the elements, and improve the clarity of the image. The all-dielectric phase change filter structure 109 comprises an upper dielectric multilayer film system 102, a phase change intermediate cavity layer 103 and a lower dielectric multilayer film system 104.

A main function of the metal absorbing layer is to absorb and block the light in a specific wavelength range to achieve selective filtering of the light. The metal absorbing layer is usually composed of one or more metals, such as aluminum, chromium, silver, gold, and the like. These metals have specific optical properties that allow them to absorb light in a specific wavelength range. Secondly, the metal absorption layer can also be used to prevent interference from background light or scattered light, improving the signal-to-noise ratio of the system. For example, in this present invention, a metal-absorbing layer can improve the contrast and clarity of the display.

Figure 2:
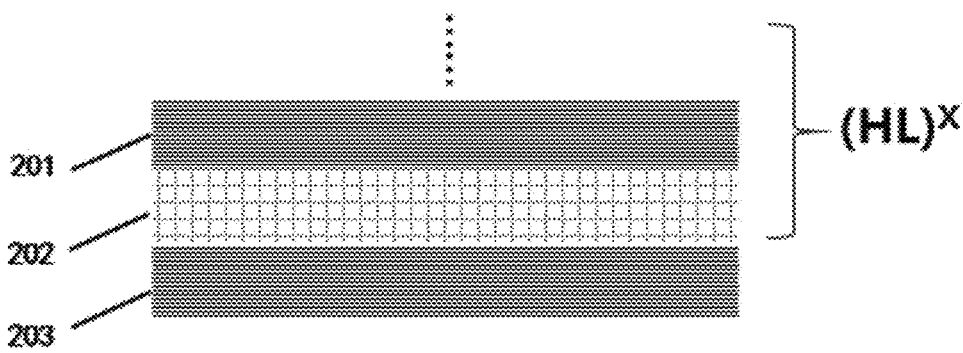
FIG. 2 is a structure diagram of the lower dielectric multilayer film system of the present invention.

FIG. 2 is a schematic diagram of the all-dielectric filter structure of the invention. The structure of the lower all-dielectric filter structure is H (LH) x, where His a film layer of high refractive index and low extinction coefficient, L is a film layer of low refractive index and low extinction coefficient, X is the number of periods of the film layer group (X≥1), and an optical thickness of each film layer is one-fourth of the wavelength used. The bottom three layers of the lower all-dielectric filter structure are a film layer 201 of high refractive index and low extinction coefficient, a film layer 202 of low refractive index and low extinction coefficient, a film layer 203 of high refractive index and low extinction coefficient.

Figure 3:
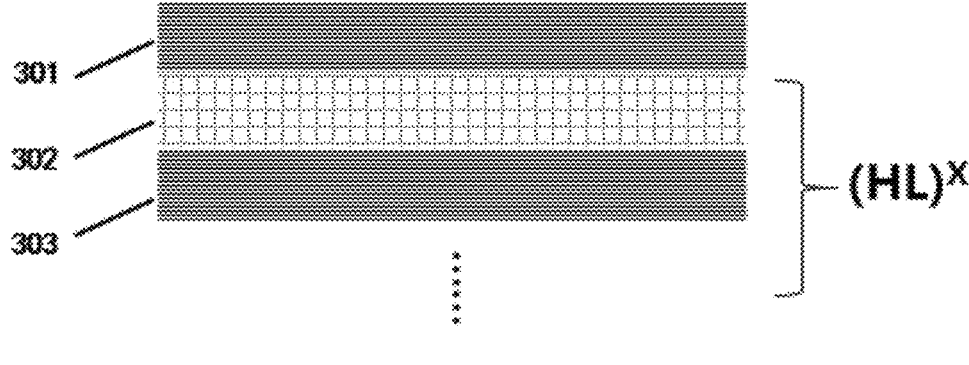
FIG. 3 is a structure diagram of the upper dielectric multilayer film system of the present invention.
Figure 4:
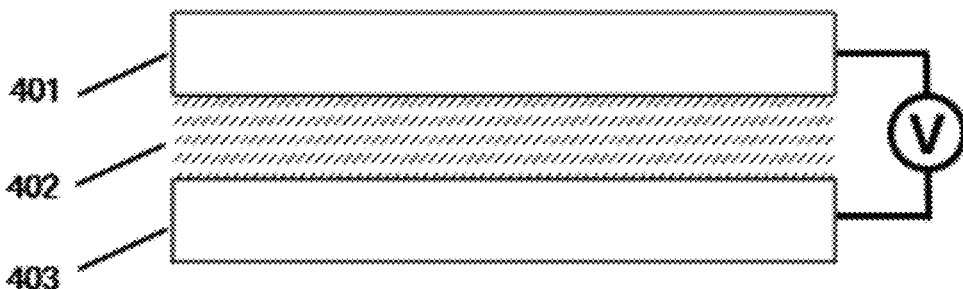
FIG. 4 is a structure diagram of the intermediate cavity layer of the present invention.

FIG. 3 is a schematic diagram of the all-dielectric filter structure of the invention. The upper all-dielectric filter structure is H (LH) x, where H is the film layer of high refractive index and low extinction coefficient, L is the film layer of low refractive index and low extinction coefficient, X is the number of periods of the film layer group (X≥1), and an optical thickness of each film layer is one-fourth of the wavelength used. The top three layers of the upper all-dielectric filter structure are a film layer 301 of high refractive index low extinction coefficient, a film layer 302 of low refractive index and low extinction coefficient, a film layer 303 of high refractive index and low extinction coefficient.

Two transparent electrode layers 401 and 403 of phase change material layer 402 sandwiched in phase change intermediate cavity layer 103 can control a crystallization state of phase change material by applying voltage. Specifically, a pulse voltage or a laser pulse of medium intensity is applied to phase change material layer 402, and a temperature of phase change material rises to a temperature range above the crystallization temperature and below the melting temperature under an action of a current or the laser pulse. The temperature range is maintained for a certain time, and the crystal lattice is orderly arranged to form a crystalline state, realizing a transition from an amorphous state to a crystalline state. A short and strong voltage or a laser pulse is applied to the phase change material, so that the temperature of the phase change material rises above the melting temperature, so that a long range of the crystal state is orderly destroyed, and a pulse drop along a very short edge leads to a rapid cooling of the phase change material to below the crystallization temperature, so that the phase change material is fixed in the amorphous state, and the transformation from the crystalline state to the amorphous state is realized. The polychromatic light emitted by the polychromatic quantum dot luminescent components is filtered by a change in the transmission of the phase change material of the phase change material layer 402 during the mutual transformation between the amorphous and crystalline states, so as to obtain the monochromatic light with the required wavelength and intensity, and then realize the color display.

The all-dielectric intermediate cavity is in the middle of the multilayer film filter structure, a thickness is half of the optical thickness, and the role is to filter out the stray light caused by an introduction of phase change materials.

The role of the anti-reflection layer 105 is to solve a problem of weak transmitted light energy caused by interface reflection, and the transmitted light treated by the anti-reflection film can not only improve the transmission rate, but also greatly reduce the energy of continuous reflection between the light elements, providing high clarity. The materials of the anti-reflection layer 105 can include the following low-refractive index materials, including but not limited to: $SiO_2$, $Al_2O_3$, $In_2O_3$, $MgF_2$. The anti-reflection film is outside the incident light of the filter structure, the thickness is generally one-fourth of the optical thickness, and the role is to enhance the intensity of the transmitted light.

Phase change materials of phase change material layer 402 may include the following chalcogenide compounds and their alloys, including but not limited to: GST, GSST, IST, GeTe, SbTe, BiTe, InSb, InSe, GeSb, SbSe, GaSb, GaSb, GeSbTe, AgInSbTe, InSbTe, $Ag_2In_4Sb_76Te_17$ (AIST). In addition, the percentages of atoms in each of the above chemical formulas are variable. The phase change material layer may further contain at least one dopant, such as C, N. Preferably, the phase change material $Sb_2Te_3$ is selected. $Sb_2Te_3$ has the largest change in transmission before and after the phase change under the same thickness, and the phase change temperature of $Sb_2Te_3$ is low, the voltage or laser amplitude required for the transformation is low, and the pulse width is narrow, which is convenient to reduce the energy consumption of the entire device and improve the response speed of the phase change material, thus improving the image refresh rate of the display device and showing better animation display effect. Phase change materials include the following low refractive index materials, including but not limited to: $SiO_2$, $Al_2O_3$, $In_2O_3$, $MgF_2$. The anti-reflection film is outside the incident light of the filter structure, the thickness is generally one-fourth of the optical thickness, and the role is to enhance the intensity of the transmitted light.

A thickness of phase change material layer 402 is less than 100 nm. Due to a increase of the thickness of phase change material layer, the transmittance of visible light will decrease, and the temperature required for the crystallization of phase change material will also be higher. The more suitable thickness is 30 nm. Although there is a larger transmission change rate when the thickness is low, there is still a higher transmittance even in the crystallized state. Therefore, it is not conducive to an all-black display of the display device. The phase change material of the phase change material layer can be driven by a laser or a voltage. When the voltage drives, the transparent electrode layers 401 and 403 on both sides of the phase change material layer 402 apply voltage to make a phase change of the phase change material.

Multiple phase change display unit arrays can be combined into a display unit, and each display unit is equivalent to a display sub-pixel. The polychromatic light emitted by the backlight source can selectively penetrate red, green and blue light after passing through the all-dielectric phase change component. The phase change unit through red can be regarded as a red sub-pixel 508, and the phase change unit through green can be regarded as a green sub-pixel 509. The phase change unit that passes through blue light can be regarded as blue sub-pixel 510, so that various colors can be displayed based on the combination of the three monochromatic light RGB, and the monochromatic light transmitted by each phase change unit can be individually controlled by electrical stimulation or laser stimulation.

Figure 5:
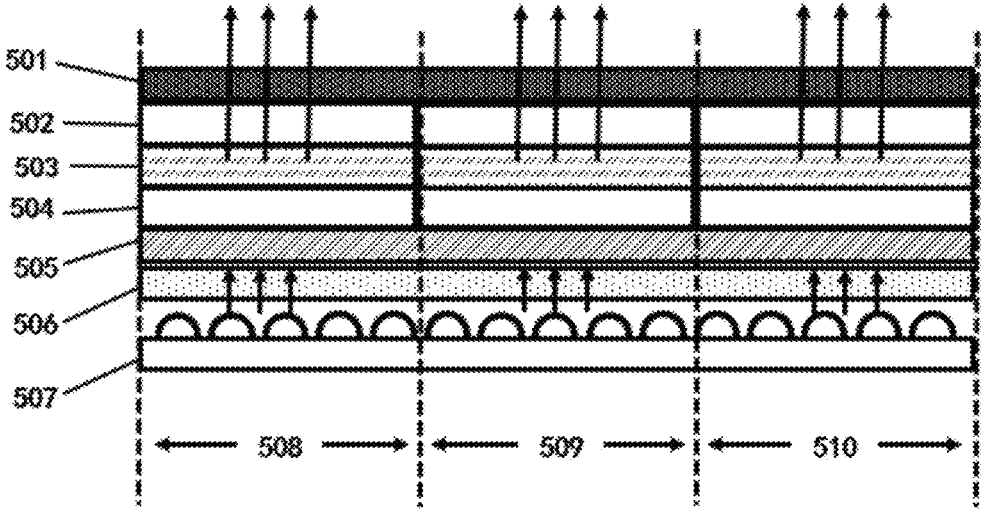
FIG. 5 is a schematic diagram of a single pixel structure of the present invention.

The diagram of the pixel structure of the backlight display device of the all-dielectric phase change material of the invention is shown in FIG. 5. The pixel structure comprises a light emitting unit, an anti-reflection layer 505, an all-dielectric phase change filter component and an absorption layer 501. Among them, the light emitting unit includes a quantum dot film 506 and a LED excitation light source 507. The all-dielectric phase change filter component comprises an upper all-dielectric filter structure 502, a phase change intermediate cavity layer 503, and a lower all-dielectric filter structure 504.

The phase change intermediate cavity layer 103 of the phase change filter component 109 has a large difference in transmittance under different states. The phase change material is stable in both crystalline and amorphous states, so the voltage or laser can be removed when the phase change material is in a stable state, so the power consumption of the entire display device is very low during the display process.

A speed of the phase change filter component 109 is very fast when it is converted between the crystal state and the amorphous state, that is, the time required for a single pixel to turn from dark to bright or from light to dark is very short, about 100 ns below, which fully meets the requirements of the display response speed in various scenarios.

Figure 6:
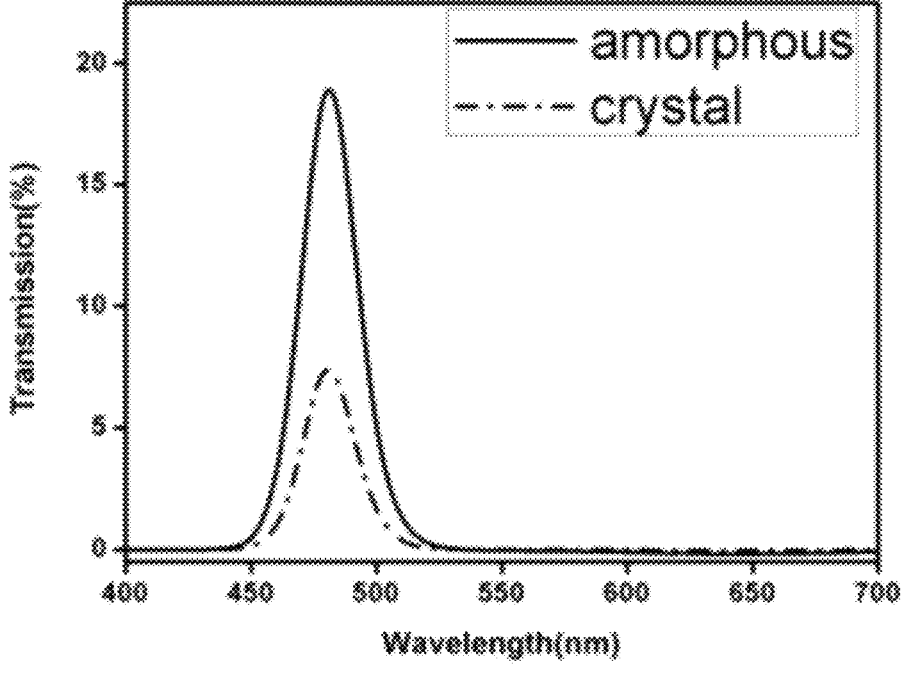
FIG. 6 shows a blue light transmission spectrum of the backlight source display device based on all-dielectric phase change materials.
Figure 7:
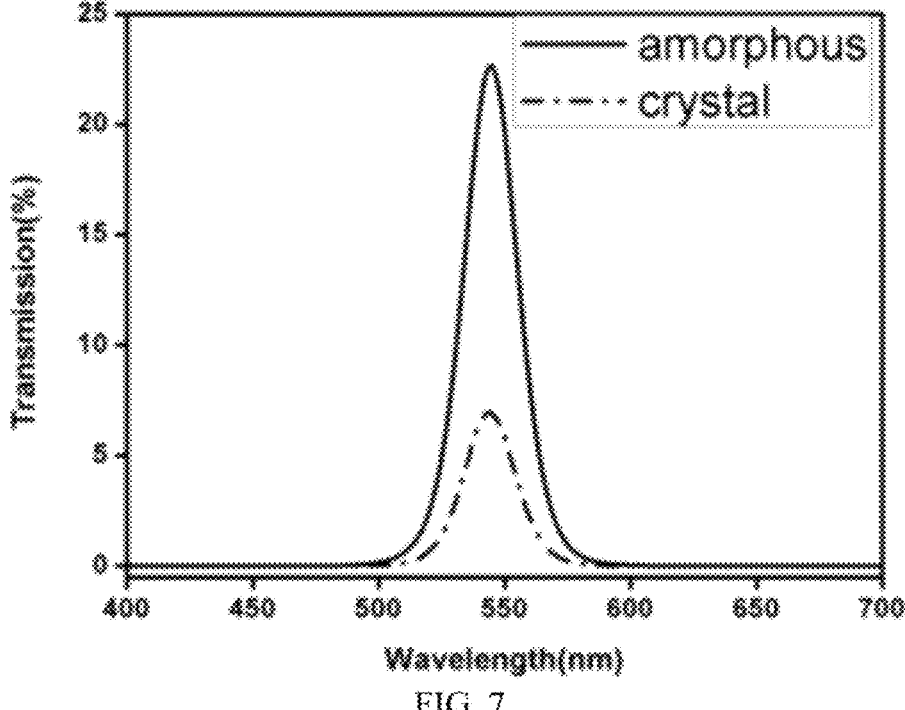
FIG. 7 shows a green light transmission spectrum of the backlight source display device based on all-dielectric phase-change materials.
Figure 8:
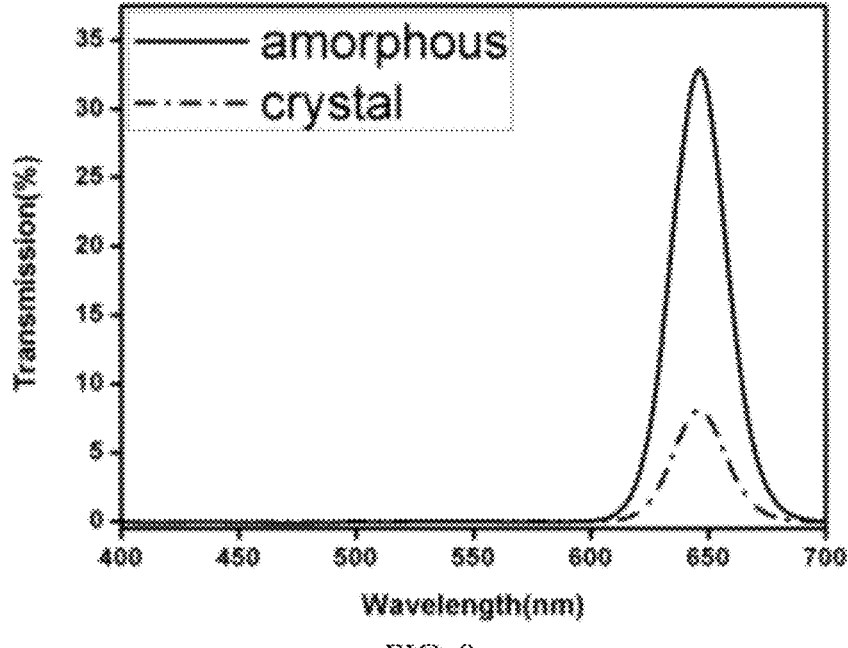
FIG. 8 shows a red light transmission spectrum of the backlight display device based on all-dielectric phase change materials.

FIG. 6, FIG. 7, and FIG. 8 are the transmission spectra of each color of the display device. After structural optimization, FIG. 6, FIG. 7, and FIG. 8 show the transmission spectra of the three filter structures in the crystallized state and amorphous state of phase change materials. The transmittance of red light with a central wavelength of 646 nm is more than 40% in the amorphous state and 8% in the crystallized state. For the green filter structure, its central wavelength is 530 nm, as shown in FIG. 7, the transmittance of red light with a central wavelength of 530 nm is more than 35% in the amorphous state and 6% in the crystallized state. For the blue filter structure, its central wavelength is 430 nm, as shown in FIG. 6, the transmission of red light with a central wavelength of 430 nm is more than 30% in the amorphous state and 6% in the crystallized state. By applying different voltages, or adjusting the laser power, the phase change material layer is changed from the amorphous state to a partial crystalline state to a full crystalline, so that the monochromatic light with the set wavelength can pass through the phase change material layer and light with other wavelengths cannot pass through the phase change material layer, and an intensity of the monochromatic light is selected. For example, 20% crystallization, 40% crystallization, and the like, can obtain the mixed phase, and some crystallization can be achieved simply by limiting a maximum current or a laser power during the conversion process. The transmittance of materials between the full amorphous state and the full crystallized state depends on a degree of partial crystallization. It is typically possible to get a phase state between 16 mixed phases and 64 mixed phases, and with an appropriate control more phases can be obtained, such as 1024. Therefore, the display device changes the transmittance of the phase change filter by controlling the voltage, and then adjusts the different ratios of the intensity of each red, green and blue monochromatic light, and finally realizes a full-color display.

Figure 9:
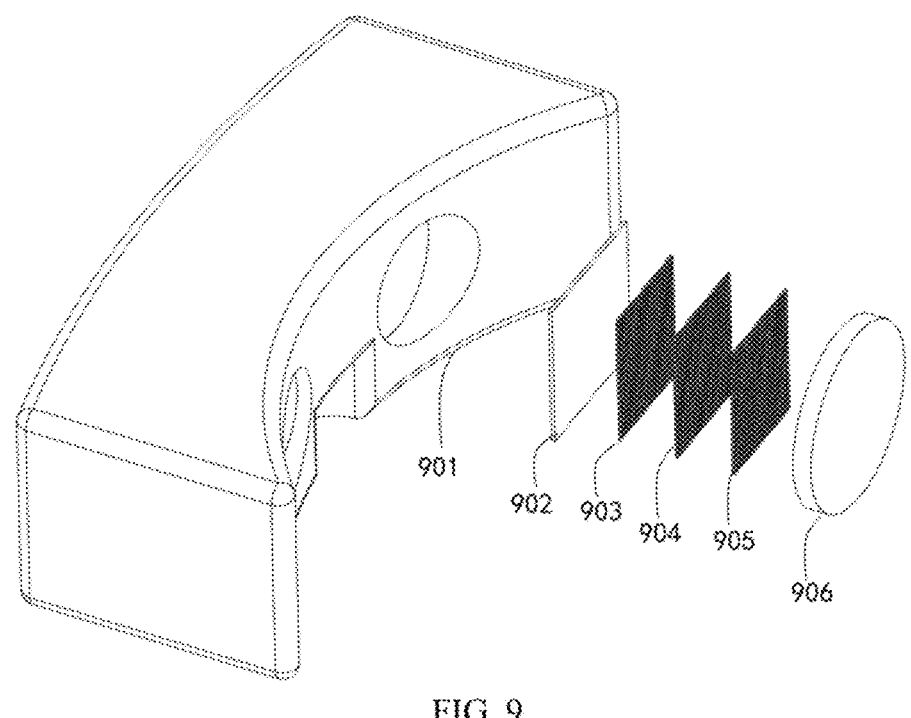
FIG. 9 is an internal structure distribution diagram of VR glasses.

FIG. 9 shows a diagram of an internal structure of the VR device of the invention. The VR device comprises an outer cover 901, a backlight source 902, an anti-reflection layer 903, a phase change filter structure 904, an absorption layer 905 and an optical lens 906. We embed an assembled display into a design of the AR glasses so that they can provide a virtual reality visual experience. A frame of AR glasses should be designed with the user's comfort and ease of wearing in mind, while the lens part should be transparent so that the user can see the real world through the lens.

In addition, we have added a touch sensing layer to the side of the glasses, through which users can perform actions such as adjusting a size, a position and a transparency of the display content.

Through the above embodiment, we can see that this virtual reality display device based on phase change materials can not only provide high-quality visual experience, but also can be widely used in a variety of devices, including VR helmets, AR glasses, and the like, thus greatly improving the user experience.

It is easy for those skilled in the art to understand that the above is only a preferred embodiment of the invention and is not intended to limit the invention, and that any modification, equivalent replacement, improvement, and the like made within the spirit and principles of the invention shall be included in the scope of protection of the invention.

What is claimed is:

1. A virtual reality display device based on phase change materials, characterized by comprising from bottom to top: a backlight source, a pixelated anti-reflection layer, an all-dielectric phase change filter structure, a metal absorbing layer and an optical lens;

wherein the all-dielectric phase change filter structure is located above the pixelated anti-reflection layer and comprises an upper dielectric multilayer film, a phase change intermediate cavity layer and a lower dielectric multilayer film, which is used to filter out a light of a specific wavelength consistent with a VR display and provide a higher color accuracy;

the optical lens is located behind the phase-change filter structure and is used for focusing a treated light;

a structure of the upper dielectric multilayer film and the lower dielectric multilayer film is H (LH) x, where H is a film layer of high refractive index and low extinction coefficient, L is a film layer of low refractive index and low extinction coefficient, X is the number of periods of a film layer group, X≥1, and an optical thickness of each film layer is one quarter of a wavelength used;

the virtual reality display device further comprises a quantum dot excitation layer, which is located above the backlight source and below the pixelated anti-reflection layer, and is used to receive and excite a background light generated by the backlight source; and wherein the all-dielectric phase change filter structure further comprises an all-dielectric intermediate cavity, the all-dielectric intermediate cavity is in middle of the upper dielectric multilayer film and the lower dielectric multilayer film and is distributed on an upper and/or a lower side of the phase change intermediate cavity, and a thickness is one half of an optical thickness of a transmitted light.

2. The display device according to claim 1, characterized in that the backlight source comprises an LED excitation light source and a diffusion plate, and the diffusion plate is above the LED excitation light source.

3. The display device according to claim 2, characterized in that a wavelength of the LED excitation light source is 420 nm, which can provide a higher energy efficiency and a longer service life for a VR device.

4. The display device according to claim 2, characterized in that a material of the diffusion plate is generally polycarbonate or acrylic acid, and its size matches a size of the LED excitation light source.

5. The display device according to claim 1, characterized in that: the quantum dot excitation layer comprises pixelated red quantum dots, pixelated green quantum dots and pixelated blue quantum dots respectively, wherein the pixelated red quantum dots, the pixelated green quantum dots and the pixelated blue quantum dot are arranged and distributed in an orderly manner in the quantum dot excitation layer to achieve an accurate color control.

6. The display device according to claim 1, characterized in that the phase change intermediate cavity layer comprises an upper transparent electrode layer, an intermediate phase change material layer and a lower transparent electrode layer.

7. The display device according to claim 1, characterized in that the optical lens is a zoomable lens, which can adjust a focusing distance according to needs of a user, and the display device is suitable for head-mounted virtual reality devices and glasses virtual reality devices.

\* \* \* \* \*